(12) United States Patent
Haley

(10) Patent No.: US 9,100,824 B2
(45) Date of Patent: Aug. 4, 2015

(54) SYSTEM TO MONITOR VEHICLE DRIVERS WITH A CAMERA

(71) Applicant: Jeffrey T Haley, Mercer Island, WA (US)

(72) Inventor: Jeffrey T Haley, Mercer Island, WA (US)

(*) Notice: Subject to any disclaimer, the term of this patent is extended or adjusted under 35 U.S.C. 154(b) by 0 days.

(21) Appl. No.: 13/892,287

(22) Filed: May 12, 2013

(65) Prior Publication Data

US 2013/0250083 A1    Sep. 26, 2013

Related U.S. Application Data

(63) Continuation of application No. 12/804,151, filed on Jul. 15, 2010, now Pat. No. 8,442,490.

(60) Provisional application No. 61/308,271, filed on Feb. 25, 2010.

(51) Int. Cl.
| | | |
|---|---|---|
| H04W 12/06 | (2009.01) | |
| H04W 48/04 | (2009.01) | |
| H04L 29/06 | (2006.01) | |
| H04M 1/60 | (2006.01) | |
| H04M 1/725 | (2006.01) | |
| H04W 4/02 | (2009.01) | |

(52) U.S. Cl.
CPC .......... *H04W 12/06* (2013.01); *H04M 1/72577* (2013.01); *H04W 48/04* (2013.01); *H04L 63/0853* (2013.01); *H04M 1/6091* (2013.01); *H04M 1/7253* (2013.01); *H04M 1/72569* (2013.01); *H04M 2250/02* (2013.01); *H04M 2250/10* (2013.01); *H04M 2250/12* (2013.01); *H04W 4/027* (2013.01)

(58) Field of Classification Search
CPC ..... H04W 4/027; H04W 12/06; H04W 48/04; H04W 4/02; H04W 4/046; H04W 52/0251; H04W 64/006; H04W 68/00; H04W 8/18; H04W 4/008; H04W 4/22; H04M 1/72577; H04M 1/72569; H04M 1/6091; H04M 1/7253; H04M 2250/02; H04M 2250/10; H04M 2250/12
USPC ......... 726/30; 701/36; 348/77; 455/418, 419, 455/456.4, 410, 411, 413, 436–444
See application file for complete search history.

(56) References Cited

U.S. PATENT DOCUMENTS

| | | | |
|---|---|---|---|
| 2007/0298771 A1* | 12/2007 | Mottes | 455/414.1 |
| 2008/0139230 A1* | 6/2008 | Mottes | 455/466 |

* cited by examiner

*Primary Examiner* — Diane Mizrahi

(57) ABSTRACT

A system for monitoring vehicle drivers with a camera. The camera may capture an image with infra-red frequency. The camera may be coupled to a crypto-authenticating chip and/or a GPS circuit.

11 Claims, 3 Drawing Sheets

SYSTEM TO MONITOR VEHICLE DRIVERS WITH A CAMERA

This application is a continuation of U.S. application Ser. No. 12/804,151 filed Jul. 15, 2010 which issued as U.S. Pat. No. 8,442,490 and claims priority from U.S. provisional patent application No. 61/308,271 filed Feb. 25, 2010, which is incorporated by reference.

BACKGROUND

Driving while looking at a display or keypad on an electronic device is dangerous because it takes the eyes off the road and requires focused concentration on interacting with the device. Merely talking on a mobile phone while driving is also dangerous, but not as dangerous because the eyes can be on the road and the concentration required for talking is less than for reading or visual controlled finger manipulation. The dangers are greater for a solo driver with no adult passenger than for a driver with an adult passenger. A technical solution is needed that will reduce the attractive distraction posed to solo drivers by electronic devices with keypads or displays, particularly mobile telephones, by restricting some of their functions when moving.

Systems to automatically restrict uses of moving phones will not be effective unless service providers make them automatic for most phones of young solo drivers in a region. This will not happen unless all vendors must implement the system at the same time. This will not happen unless implementation is required by legislation. Legislators will not require implementation unless:
 1. Writing, reading and incoming text message rings are blocked.
 2. Emergency calls can be made and received while driving.
 3. Phones of independent adult passengers are not restricted.
 4. Voice calls are allowed for independent adults when driving is easy, but calls by dependent children or employees are limited.
 5. Costs to voters and cell phone users are modest.

OBJECTIVES

Electronic devices with keypads or displays of all kinds usable in automobiles (including dashboard electronics with displays, entertainment, and driver assistance) can be programmed so that certain functions of the display, keypad, speaker or microphone cannot be used or have modified functionality at certain times. A core objective is to disable or restrict some of these functions when located in a vehicle moving at more than a threshold speed and the device is in easy view of a solo driver but not when in a passenger's hands. The device might be more restricted when experiencing acceleration from lane changes or turns or speed changes and less completely restricted when moving at constant speed with no lateral acceleration. The restrictions might be greater for children and employees than for independent adults.

Systems to control restricting uses of dashboard mounted devices should be designed to also control restricting of hand held devices. However, it will be roughly 15 years before such systems are in 80% of the vehicles used by young people. In the meantime, as phones are replaced every two years on average, we can implement now a solution that operates in the phones and the telephone networks. Systems that are first implemented in the phone system should be compatible with future phone restricting systems based in the vehicle.

No User Action Solutions

The preferred solutions are "no user action" (NUA) solutions (all driver phones are automatically restricted when moving by action of the phone system) rather than "user action required" solutions (phones are not restricted when moving unless the owner of the phone or vehicle has installed a system to do so). In the "no user action" (NUA) solutions, cell phones of young solo drivers (and sometimes passengers) will be restricted when moving faster than a threshold such as about 15 mph (plus or minus about 8 mph).

The phones of passengers (and sometimes drivers) may unrestrict if they connect to an unrestricting override transmitter. The override transmitters may unrestrict the phone if the phone display is not in view of a driver or there is another passenger in the car, which might be determined by detecting the presence of another active phone in the car and the usage patterns of the two phones show they are not typically used by just one person.

There are four types of unrestricting override transmitters:
 1. If there are two active cell phones in the vehicle connected by Bluetooth and SMS message and their usage patterns show they are not typically used by a single person, one phone may act as an override transmitter for the other.
 2. Retrofit override transmitters will be available that any car owner can buy and install to uncripple passenger phones, whether or not there is a second cell phone in the car.
 3. Mass transit vehicles will have override transmitters for all new phones in the vehicle.
 4. Newly manufactured vehicles will be made with override transmitters that will determine which phones are unrestricted and when.

Phones issued to children or employees can omit the unrestricting feature at the option of the phone owner. They will remain restricted whenever they are moving. Alternatively, they can be programmed with a different restricting algorithm to be more often restricted or more greatly restricted than standard phones.

COVERING YOUNG DRIVERS FIRST

Figure 1:
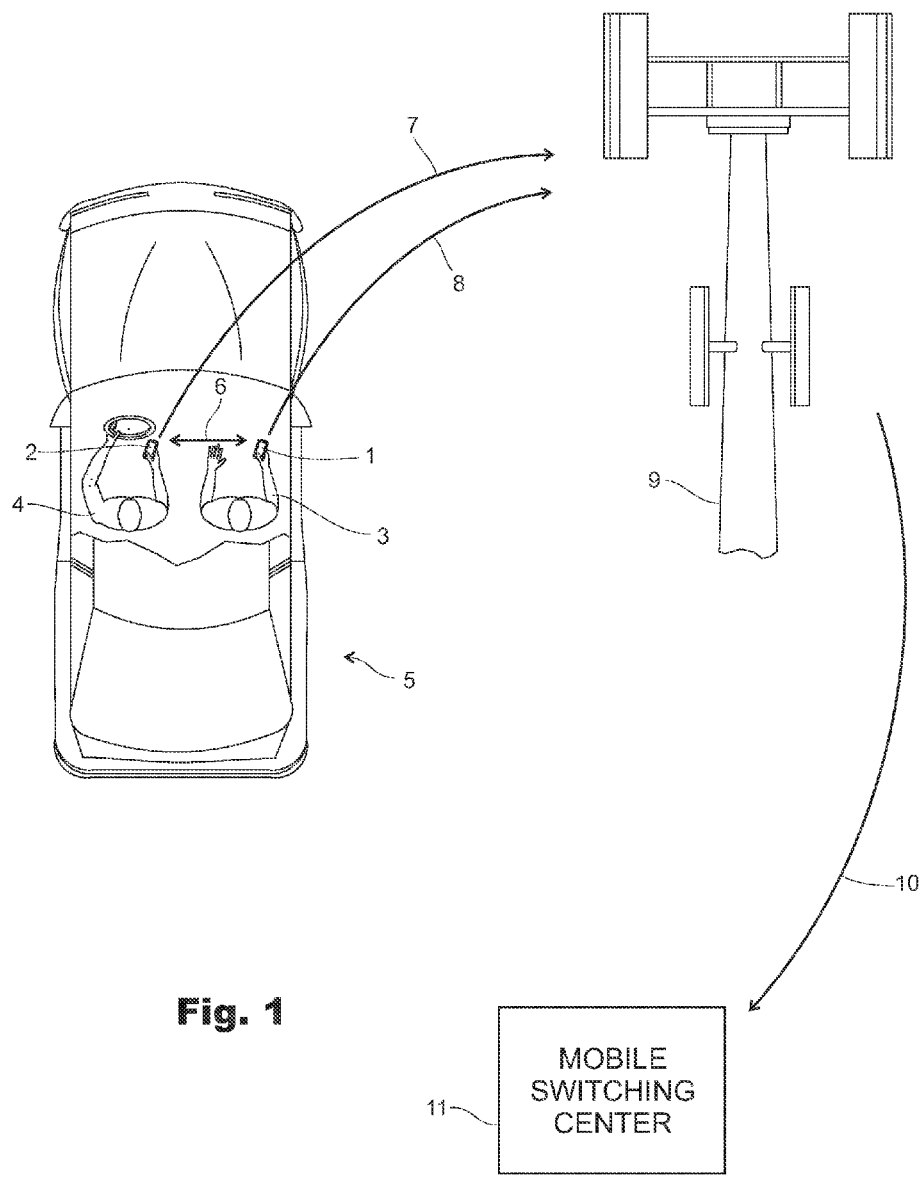
FIG. 1 shows a conventional phone 2 acting as an unrestricting override transmitter for a new phone 1.

The system described herein requires two elements for full implementation in a region:
 (1) restricting moving phones in the region, and
 (2) partially unrestricting selected moving phones at selected times.

Element 1 can be implemented merely with changes to the phones and no changes to the network or with small changes to the network. Element 2 requires upgrades to the network to prevent abuse to unrestrict driver phones in private vehicles. To optimize early benefits of costs, the implementation should be done region by region and happen sooner in higher priority regions than in lower priority regions.

However, where parents or employers want their dependent children or employees to have phones that are restricted when moving and are willing to accept that the phones may not be unrestricted when the person is a passenger, they can get the new phones for use in any region before such phones are required in that region. This will implement element 1 for these new phones but not element 2.

When the system is made mandatory in a region, because young drivers present a much greater risk to others and themselves than older drivers, to achieve the greatest benefits at lowest cost, the system can be implemented first for new phone numbers issued after a start date to billing addresses in the implemented area and adjoining areas and/or to numbers with a particular area code. This cut off will also cover phones that present lower risk, such as those issued to children too young to drive and newly issued numbers for older people, but it will cover virtually all the young drivers. Then, to keep their phones working, people with a recent history of substantial use of their phone in the area and a phone number issued after a cut-off date in the past can be required to receive a software download to motion-restriction enable their phones or trade in their phones for a new motion-restriction enabled phone (preferably at no additional cost to the phone owner because other highway users will benefit more than the phone owner). The cut off to cover older numbers can be set farther back year by year. By the time numbers as old as about 15 years are covered, the system may be at an optimum for cost-benefit, in which case phone based restriction may never be extended to phones with still older numbers.

Here is a summary of an implementation roll-out plan:
1. Require all carriers to set up motion triggered display and ring restricting capability in a specified area by a start date.
2. Require public transit that operates in the area to install override unrestricting transmitters by the start date.
3. For subscribers with a billing address or area code in the selected and surrounding areas, require all carriers to issue motion-restricting-enabled phones for new phone numbers issued after the start date.
4. By date 1, require that carriers have replaced the phones for each phone number issued since past date—1 that has a record of recent substantial use in the area;—by date 2, each number issued since past date—2; etc.

Forms of Restriction that Allow Emergency Uses and Other Uses while Driving

There are myriad situations when an out-going call should be allowed or an in-coming call should be allowed, particularly emergency situations. An optimal system might block all text message alerts or display and all reading, writing, or other user interactions with a display while moving (or moving and accelerating), but, to accommodate emergencies, it should not block all voice communications while moving. The objective is to limit functions that cause greater driver distraction when the driver needs more concentration on driving while allowing more important communications that cause less distraction at times when the driver requires less attention on driving.

Level of attention required for driving can be approximated with an accelerometer in the phone or sensors the vehicle. The device can be programmed to determine when the vehicle is speeding up or slowing down or turning or quickly changing lanes. If mounted in the vehicle, the device can receive inputs from various vehicle sensors that suggest when more attention is required for driving. At these times, the outgoing voice signal or the incoming voice signal or both can be interrupted or suspended (and perhaps replaced with a sound or recorded words) to reduce distraction for the driver and inform the other party to the conversation that the driver needs to pay attention to driving at this time.

If it can be shown that voice communications while driving present a lower risk when headsets are used than when handsets are held to the ear, a restriction when the phone is moving and near the driver might be to stop the handset speaker from working and require use of a headset speaker.

Conversations with a passenger in a car present less of a distraction than telephone conversations, because the remote conversant does not know what else the driver is doing simultaneously and what the driver is seeing, while the passenger does. The passenger understands what is happening when the driver pauses to concentrate on driving. The concentration demands for a telephone conversation can be reduced and made more like the demands for conversation with a passenger by, when the phone in the hands of a driver is moving faster than a threshold speed, periodically playing a beep or other signal to both parties to remind them that one of the parties is also driving.

The system can be programmed so that, when a caller calls a phone that is moving and not allowed by an override transmitter to be unrestricted, before the phone rings, a message is played to the caller saying: "The person you are calling appears to be driving. If this call is important enough to interrupt that person while driving, press 1." The called phone would only ring if the caller presses 1. Otherwise, the call is rerouted to voice mail. Implementation details are described in Appendix A.

As described above, for independent adult drivers, restricting phones that are moving to block texting and display interactions but only temporarily block voice communications while also accelerating may be sufficient to solve the problem of distracted driving while also allowing sufficient use of phones while driving to satisfy the desires of drivers. However, for children, or children and certain employees, the parent or employer may prefer a greater level of restriction. In this system, the phone owner can have a password that allows greater restriction to be placed on the phone when it is moving or allow lesser unrestriction when another person is present.

Here are examples of possible voice call restrictions that may be preferred in these situations for outgoing calls.
(1) Only calls to 911 or any other listed emergency number are allowed.
(2) Phone numbers of family members are listed with the cellular service provider and only calls to these numbers are put through while the phone is moving.
(3) Speed dial calls are allowed but not calls requiring pressing more than 3 keys.
(4) Voice calls to other than listed emergency numbers are cut off after 3 minutes.

Here are examples of possible restrictions for incoming calls.
(5) The likely source phone numbers of family members are listed with the cellular service provider and only calls from these numbers are put through while the phone is moving.
(6) Voice calls from those listed family member numbers are cut off after 3 minutes.

Methods to Automatically Restrict Moving Phones with No User Action (NUA)

To implement the automatic no-user action restricting, speed of movement of each cell phone can be established by the telephone system by using one or more of:
(1) a distinguishable pattern of changes in signal strength received by cell base stations from phones,
(2) cell base station angle of arrival (AOA), which requires at least two towers, locating the phone at the point where the lines along the angles from each tower intersect,
(3) cell base station time difference of arrival (TDOA), which works using multilateration, (4) changes in location signature, which uses "fingerprinting" to store and recall patterns (such as multipath) which mobile phone signals are known to exhibit at different locations in each cell,
(5) needing a hand-off of phone connection from one cell to another,
(6) GPS in the phone,
(7) a distinguishable pattern of changes in signal strength received by phones from cell base stations, or
(8) an accelerometer in the phone with software to integrate accelerations and periodically reset the zero point.

Methods 1-5 can be implemented in the base station software for each cell or its switching center. Methods 6-8 must be implemented in the phone. Each cellular service provider can be allowed to determine which method to use and the methods can vary over time or by cell phone.

Speed Determination by Accelerometer in the Phone

As mentioned above, determining speed of the phone with an accelerometer in the phone may be preferred because it can be done with adequate robustness and very low power drain (in contrast to GPS). If the acceleration data is mathematically integrated over time, which can easily be done in a processor, the result is a speed value. Imperfections in the system limit the accuracy and precision, but it is sufficient for the minimally required robustness. Very low power accelerometers can be added to all new phones at low cost.

A significant limitation is that the zero point (a speed of zero relative to the earth) needs to be reset periodically or it will drift. Each reset can be based on GPS in a phone that includes this circuit or by communication with cellular base stations by one of methods 1-4 above. The verification (and the reset) can be programmed to occur only when the phone is receiving a strong GPS signal or only when base stations are not busy. The phone or override transmitter can be instructed by the base station to reset itself at any time as determined by the base station. The reset can be done when the phone or override transmitter is known to be stopped or when a non-zero speed of movement of the phone or override transmitter is known.

Because the system should be implemented with no user action (NUA) required, speed determination and restricting must be implemented in the phone and/or the phone network for each new phone. However, when a new phone is used in a new automobile, electronics in the vehicle can take over control of determining speed, as further described below. This will reduce drain on the battery in the phone.

Authentication Required for Override Transmitters

Whether in private vehicles or mass transit vehicles, unrestricting of moving phones is determined by receipt at the phone of a wireless signal from an override transmitter. It is necessary to include a method for each phone or its network to authenticate the override transmitter. Otherwise, sociopathic entrepreneurs could make and sell override transmitters that will unrestrict phones of solo drivers or children or employees when they should not be unrestricted. The authentication method need not be strong. It only needs to be strong enough to make it expensive to make and sell an unauthorized override transmitter that will work more than about half of the time for any driver.

Crypto-authenticating chips are well known. They are designed to receive as input a first data string and, in response, output a second data string. When both data strings are processed together with a secret key, the result will show the second data string to have been produced by the crypto-authenticating chip or not. The second string cannot be inexpensively determined from knowing the first string without having the key. In an embodiment of the present system, the new phone sends a first data string to an override transmitter mounted in the vehicle, receives a second data string from the crypto-authenticating chip, and sends them both to its network which makes the comparison with a key. If the network determines that the strings do not match with the key, it responds with a command to the cell phone that it must not be unrestricted.

The secret key for each crypto-authenticating chip is securely supplied by the override transmitter manufacturer to a single entity that cooperates with network operators, which entity operates a secure database and comparison service to perform the authentication for the network operators.

Each authenticating chip includes an identifier (a serial number) that is transmitted by the override transmitter with each override transmission and passed on by the unrestricted phone to the network. As each authentication is performed, data is tracked to identify any repeated use of an override transmitter that is inconsistent with proper use. For example, the data may show that a crypto-authenticating chip has been duplicated or simulated and appears to be used simultaneously in two different places.

The serial numbers also identify the class of vehicle in which the transmitter is to be installed, whether a small passenger vehicle such as a taxi, mid-size, such as a van or small bus, or large vehicle. If the transmitter is resold after its first use, it may only be used in the proper class of vehicle. If it is used in a different class of vehicle, the verification data base comparison service will flag that the uses appear to be incompatible with use in the proper class. This will allow any stolen or improperly resold override transmitter to be discovered and not allow further unrestricting by the transmitter.

In some cases, the override transmitter may be a neighbor cell phone 2, as described below. In these cases, an identifier of the neighbor phone known to the network, such as its phone number or IMSI number, is used for authentication to the network.

Communications with Vehicle Mounted Unrestricting Controllers

Each phone with a recently issued phone number will be restricted when in motion in the implemented area unless the phone receives an override signal that verifies the phone may be unrestricted. The speed determination for restricting control will be done in each phone and/or its network. However, automobiles made in the future will include processors that control restricting of dashboard mounted electronics and these same processors should also control restricting of each phone in the vehicle as a function of input from sensors mounted on the vehicle that detect speed, passengers present, approaching particular intersections, and other useful inputs.

Communications from the vehicle mounted restriction control processor 21 to a hand held communications device, such as a cell phone 1, can be established by Bluetooth or WLAN or 802.11 or any other radio communications protocol, including cell phone protocols. The user of the new phone that wants it to be unrestricted while moving presses a key to accept the connection to the vehicle mounted controller 21, so there is never a problem with automatic connection to a controller in another vehicle. The communication protocol is used to exchange the authentication data strings described above as well as commands to unrestrict or rerestrict. Each new phone with motion-restriction capability should include the capability to have control of its motion-restriction taken over by a vehicle controller that is then authenticated to the net work by the process described above. This will be used in few cars at first, but the number of cars with such a feature will increase over time.

Bases for Determining Permission to Unrestrict

Each telephone network can decide which methods for determining permission to unrestrict will work with its phones, and these methods can be changed over time by download. The effect of unrestricting can be more limited or zero for phones of children or employees. These methods fall into three classes:
(1) detection of a passenger who will act as "chaperone" for the driver, in which case all phones in the vehicle may be unrestricted,
(2) detection that the phone in question 1 does not have a display in a location where the driver can read it, and
(3) the phone is in a mass transit vehicle.

Private vehicles made in the future will include methods 1 or 2 (or both) in a built-in unrestricting controller with override transmitter. Such methods suitable for manufacturing in vehicles are detailed in a separate document. Methods that are suitable for retrofit into existing vehicles, and having compatibility with future built-in systems, are described below.

Retrofit Override Transmitter Detects Presence of a Passenger

A simple method for determining unrestricting relies on desire for self-preservation: passengers 3 will watch what the driver 4 is doing and intervene if the driver is doing something dangerous. Therefore, when a competent passenger is present (and acting as a chaperone), it is much less important to restrict the driver's phone 2 than when no passengers are present.

There are two methods to detect whether a passenger is present:
(1) sensing of conducted heat or radiated heat or mass or capacitance of the passenger's body 3 or some combination of these, and
(2) detecting (with authentication) a wireless electronic device, such as a cell phone, carried by the passenger.

Two preferred embodiments are described below. In some embodiments, the detectors cannot distinguish between the body or cell phone of a passenger and that of the driver. In these embodiments, the system is designed to detect the presence of two bodies or two cell phones.

Driver's Cell Phone (Conventional or New) Acts as an Override Transmitter for the Passenger Phone A preferred embodiment is to program each new phone 1 with an added feature that determines whether there are at least two active phones in the vehicle and, if there are, unrestricts each new phone 1 or unrestricts each new phone that requests unrestricting if a user of the neighbor phone 2 enters input to approve the unrestricting. Existing phones can accomplish this by one of two ways:
(1) Establishing a Bluetooth or similar connection 6 and an SMS connection 7,8 between the phones and using the two together for authentication, or
(2) Simulating a base station to communicate with the neighbor phone and obtaining its identifying number for authentication.

New phones can include additional features to act as an unrestricting override transmitter for other new phones by other methods.

Use of SMS and Bluetooth Together

The new phone 1 and any neighbor phone 2 in the vehicle can connect by Bluetooth 6 (or any other similar protocol), with a user of each phone 3,4 providing any required user permissions. In a preferred embodiment, an enigmatic data string that would be impractical or impossible for a user to enter at a phone keyboard is passed between the new phone 1 and the neighbor phone 2 by SMS via their network connections 7,8 to a cellular base station 9. It is also sent between the neighbor phone 2 and the new phone 1 by their Bluetooth connection 6 (or by SMS with a separate validating message sent by their Bluetooth connection).

This pair of transmissions, comprising one communication on each link and data in one transmission dependent on data in the other, establishes a correct telephone network number for the neighbor phone, and, because the phones are connected by Bluetooth establishes that they are near each other. Having established these two elements, the new phone 1 may unrestrict itself. The unrestricting may be designed to require a user 4 of the neighbor phone 2 to provide input giving permission for the new phone to unrestrict.

After unrestricting, the new phone sends the confirmed number of the neighbor phone 2 to the network Mobile Switching Center 11 (or it was captured by the network from the SMS message between the phones) where a determination is made whether the usage patterns of the two phones show they are usually used by different people. An algorithm for making this determination is in Appendix B. If the data shows they are not used by different people, the network sends a message back to the new phone commanding it to rerestrict.

The enigmatic data string may be generated by a pseudo-random number generating algorithm or may be one of many such strings stored in a memory and selected by rotation. It may have as few as 6 bits if it is not viewable by the sender or not enterable by the receiver (or both). The subterfuge to be avoided is that a solo driver has two phones and sends the enigmatic string to a not-present phone by SMS and then sends the same string from his present second phone back to his first phone by the Bluetooth connection.

New phones can include additional features to act as an unrestricting override transmitter, such as a crypto-chip that securely passes the neighbor's network identifier to the new phone to eliminate the need for the SMS transmission between the phones, or other secure method to transmit an identifier of the unrestricting phone for authentication by the network.

Additional details on this SMS plus local radio link (such as Bluetooth) method for authentication are described in Appendix C.

New Phone Simulates a Base Station

This method works by the new phone 1 communicating like a base station with each cell phone in the vehicle. If it establishes bi-directional communication with at least one other active phone 2 in the vehicle, it authorizes itself to be unrestricted. For authentication, the other active phone transmits its network identifier to the new phone which transmits it to the network where a determination is made whether the usage patterns of the two phones show they are used by different people. Each new phone can include this feature.

The new phone 1 transmits a base station signal for each network available in the area. Each transmitted signal is strong enough to be stronger than the ambient base station signals for any phone within about 2 meters. When a nearby phone 2 detects the base station signal, it sends a request to connect if the signal is stronger than any other for its network. The new phone 1 responds with a request for an identifier of the nearby phone and, after it receives the identifier, rejects the request to connect. Communications from the detected phone 2 to the new phone 1 are sent at least two times and the phone unrestricts itself only if the signals have low variation in strength, indicating that the two phones are moving together and not in different vehicles.

To minimize subterfuge, the new cell phone obtains the identifier (phone number) of each detected active phone in the same vehicle. If a phone is detected, the new phone is unrestricted. If two such phones are detected, no further checking step is taken. If only one is detected, the new phone sends its number to the network for the network to determine whether this number is one that should not allow unrestricting. The number will not allow unrestricting if the network reports that the new phone and the detected phone have usage patterns which indicate that the phones are used by a single person, in which case the network will respond with a command to the new phone 1 to rerestrict.

Retrofit Vehicle Mounted Override Transmitter for General Use

Figure 2:
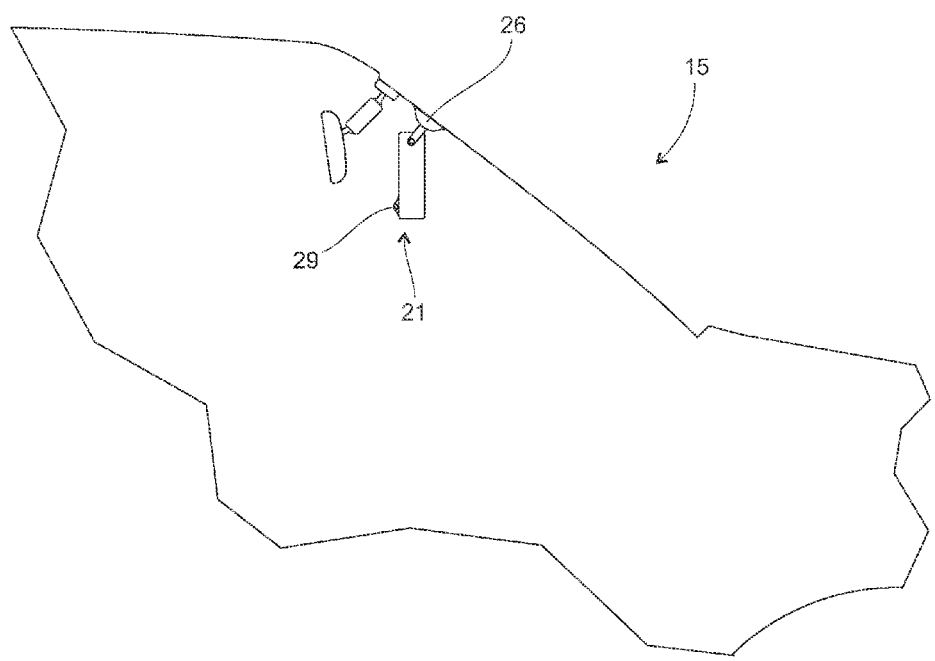
FIG. 2 shows a retrofit override transmitter that detects presence of two people mounted in a vehicle.
Figure 3:
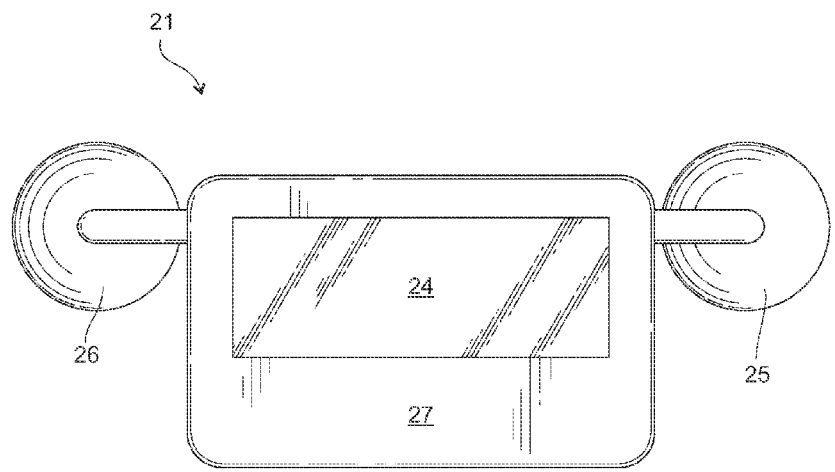
FIG. 3 shows the forward facing side of the retrofit override transmitter of FIG. 2.
Figure 4:
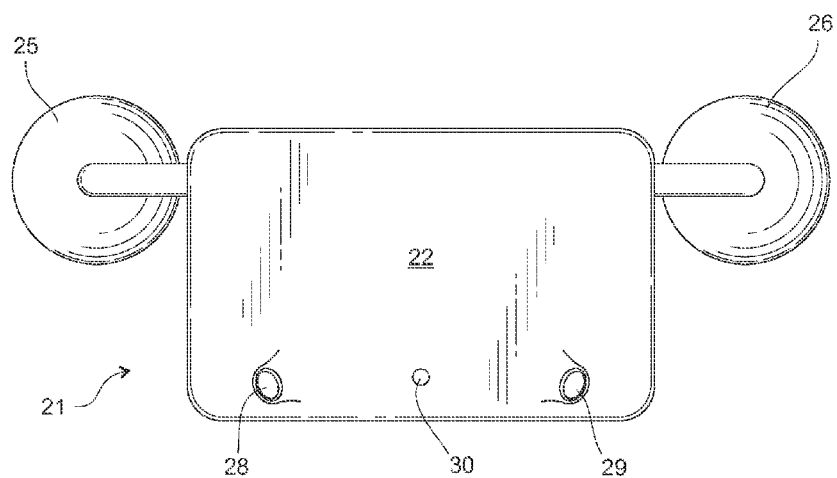
FIG. 4 shows the rearward facing side of the retrofit override transmitter of FIG. 2.

Power drain on the battery of each new phone 1 and each conventional phone 2 that it might detect can be reduced by adding to the vehicle an override transmitter 21, shown in FIGS. 2-4, that detects the presence of two people 3,4 in the vehicle 5 and authorizes each new phone in the vehicle to be unrestricted.

The override transmitter 21 establishes bi-directional radio communications with each new phone 1 in the vehicle, as described above, and uses this link to authenticate the override transmitter 21 to the network, as described above, and to control unrestricting of the phone 1. When the phone 1 is thus controlled while moving faster than the threshold speed, it does not need to monitor its speed internally, saving battery life. For determining speed, the override transmitter 21 includes a GPS circuit, and perhaps an accelerometer to extend battery life as described above.

The retrofit override transmitter can detect the presence of two people 3,4 by either of the two methods previously mentioned:

(1) detecting the presence in the vehicle of at least two cell phones, and
(2) sensing of conducted heat or radiated heat or mass or capacitance of the peoples' bodies 3,4 or some combination of these.

For method 1, the phones can be detected by simulating a base station as described above. However, it is preferable for phones in the vehicle to be sensed by Bluetooth 6 or other local radio connection link built into the phone. For authentication, the phone to be unrestricted can send a text (SMS) message 8 to the other phone 2 in the vehicle using that phone's number (network identifier) and then receive from that phone 2 a response though the local radio link 6. Or the local radio link 6 can be used to cause the neighbor phone to send an SMS message 7 to the new phone 1. The network performs a verification that the neighbor phone's number is valid for unrestricting (usage pattern shows use by separate people) and commands the new phone to rerestrict if the number is not valid.

When designed to use method 2 above (sensing of two people), the vehicle mounted override transmitter 21 has an advantage over method 1 and the method of using the driver's cell phone as an override transmitter in that the driver is not required to carry a cell phone to make this device functional. In method 2, authentication may be accomplished with a crypto-authenticating chip mounted in the override transmitter 21 as described above.

For method 2, the vehicle mounted override transmitter 21 can include two small cameras 28,29 mounted so that their fields of vision do not effectively overlap and diverge at about 80-150 degrees from each other, as shown in FIGS. 2 and 4. The angle can be adjustable provided it cannot be adjusted to achieve effective overlap. Each camera 28,29 is sensitive to radiated heat (infra-red). Each camera is coupled to an image processor that determines whether an object in view is enough warmer than its surroundings and large enough (covers enough pixels) that it is adult-human-like. When the override transmitter 21 is mounted in the vehicle 15, one camera 28 is aimed at the driver's seat and the other camera 29 is aimed at the passenger's seat (or any two seats). The transmitter 21 sends an override unrestricting signal to any new phone in the vehicle when it detects the apparent presence of two live-adult-like objects.

The above described retrofit override transmitter with cameras requires the following components: (1) power supply, (2) two small IR cameras 28,29 of the size used in cell phones, (3) image processor, (4) Bluetooth circuit and antenna, (5) crypto-authentication chip, (6) GPS circuit, and (7) control processor. These circuits can be integrated and the device can be made quite small with low power drain.

The retrofit override transmitter with cameras 21 can be adjusted to very rarely fail to detect the presence of two adult bodies (false negative). The only substantial risk of a false positive is if a young solo driver carries a large dog or a large child or an incompetent adult in the passenger seat. Other large objects would not give a false positive because they would not radiate enough heat. If either camera 28,29 is covered or otherwise disabled, no phone will be unrestricted.

The vehicle mounted override transmitter device may get its power from the vehicle, such as by plugging into a cigarette lighter. Or it may be battery powered to eliminate the need for a wire to a power source. The battery may be recharged by a solar cell 24. The device may be designed to adhere to the windshield of a vehicle 15, such as via suction cups 25,26, with a solar cell 24 on the adhesive side. To save battery life, the device may include an accelerometer and go to sleep when it detects no acceleration above a threshold A1 for more than M1 minutes, waking again when A1 is exceeded. An LED 30 mounted on the rearward side 22 may indicate when the device is operating.

Passenger Phone Unrestricting Transmitters for Mass Transit Vehicles

In mass transit vehicles that pass through areas affected by the restricting system, unrestricting override transmitters will be installed. The override transmitters will establish bi-directional radio communications with each new phone in the vehicle by Bluetooth or 802.11 or WLAN or any other similar protocol and unrestrict each phone in the vehicle upon request by the phone user.

The crypto-authenticating chip in each mass transit vehicle will send a special number recognized by the network as a number that was issued to a particular mass transit company. The use of the crypto-authenticating chips will be tracked as described above to detect theft or other abuse.

Drivers of mass transit vehicles can be required by their employers to carry phones that will not unrestrict in that vehicle. Phones of children or employees that are programmed to be not unrestrict when two adults are in the vehicle (unlike the phones of independent adults) will still unrestrict when they are in mass transit vehicles.

APPENDIX A

Method for Importance Query Before Putting a Call Through to a Driver and Holding Pushed Data 1. The new phone 1 is moving at a speed that requires restricting. The new phone searches for an unrestricting override transmitter. If one is found, it completes the process of unrestricting, if available.
2. If the new phone must remain restricted, it reports this status to the network. There may be several different restricted status states, as determined by the phone or the override transmitter.

3. When the network receives a call for a restricted phone in a state when only important voice calls will be put through, it plays a message to the caller such as "The person you are calling is driving. Is this call important enough to put through? Say yes or no or press 1 for yes or 2 for no."
4. If the answer is yes, the call is put through.
5. During the driving restricted status state, the network holds SMS messages and all pushed data such as RSS feeds, Twitter messages and web messages to put through after the restricted status state ends.
6. When the phone exits the restricted status state, it reports its new state to the network.

APPENDIX B

Algorithm for Comparing Phone Usage Patterns

A usage data set, or derivative of the set, is stored for each phone. Comparisons of the usage data set for the new phone to the usage data set for the neighbor phone indicate whether the phones are likely used by a single person.

Each data set contains usage information for a phone over the last D1 days. A likely preferred number for D1 is 20. Each data set is updated nightly and the oldest day's information deleted. The data for each day includes the start and stop time for each voice call and the number connected to, the destination of each text message, and an identification of the cell in which the phone was located.

When a message is received by the network that a new phone has unrestricted based on detection of a neighbor phone, the network system contacts the system of the network carrier for the neighbor phone and requests the usage data set (or an update to the set it already has) for the neighbor phone (unless it already has the full data set from a prior request).

A first comparison looks at how often phone A is in use for voice but not connected to phone B at the same time that phone B is in use but not connected to phone A, relative to how often each is in use connected to other phones not simultaneously. If the phones are often used but rarely used simultaneously while not connected to each other, the phones are likely used by a single person. If this comparison exceeds a threshold, the phones are presumed to be used by a single person and at other comparisons may rebut this presumption.

A second comparison looks at how often phone A is connected to phone B relative to phone A's connection to other phones, and how often phone B is connected to phone A relative to phone B's connection to other phones, both for voice calls and for text calls. If they are frequently connected to each other relative to other phones, the presumption is rebutted.

A third comparison looks at cell identifications when the phones are connected to each other. If the cell identifications are different often relative to the number of calls made and/or connections between the phones, the presumption is rebutted.

This algorithm can be changed at any time to avoid scamming abuse.

APPENDIX C

Details on Bluetooth+SMS Unrestricting Authentication

This authentication method comprises core functionality that will work with nearly all Bluetooth enabled cell phones plus several levels of enhanced functionality that will work with phones that have newer Bluetooth profiles and protocols. Vehicle owners or drivers who wish to help their passengers avoid the automatic restricting can download into their Bluetooth enabled phones application programs that add enhanced functionality. Steps in the process include:

1. The new phone 1 is moving at a speed that requires restricting.
7. A new phone user 3 starts an action that is not allowed in restricted mode.
8. The new phone begins a Bluetooth search for neighbor cell phones. If one is found, the new phone requests a connection 6. If two or more neighbor phones are found, it sends requests to each to determine which has the best profile and protocol support for the unrestricting authentication and presents to the user options for the user to choose which one to connect to.
9. The neighbor phone 2 receives the request to connect and presents the request to its user 4. If the user has previously allowed this connection, it connects automatically.
10. If the network identifier (phone number/IMSI) for the neighbor phone is not known to the new phone 1 (stored in a memory), the new phone requests it. It can be sent by the neighbor phone 2 by Bluetooth 6 or by SMS 7,8 to the new phone. If it is sent by SMS, the message can include an enigmatic data string which was previously sent by the new phone via the Bluetooth link. If it is not sent by the neighbor phone 2, the new phone user 3 can enter it manually.
11. An SMS message must be sent between the phones via their network connections 7,8, in either direction, to confirm to the new phone (and the network) that the number is correct for the neighbor phone (for authentication of the neighbor phone acting as an override transmitter). For security, the message may also contain an enigmatic data string. A separate data packet containing the string or based on the string must also be sent via the Bluetooth connection 6, either before or after the SMS message is sent and in either direction. The enigmatic data string may be generated in either phone. For simplicity, it is preferably generated in the new phone 1.
12. An application program downloaded into the neighbor phone 2 passes the enigmatic data string between the Bluetooth connection 6 and the SMS connection 7. Once the owner of the neighbor phone 2 has approved the use of this phone as an override transmitter for a particular new phone 1 (or all new phones), the connections and transmissions will happen automatically with no action required by the user of the neighbor phone 2.
13. If the neighbor phone 2 cannot be programmed to forward a data string from one connection to the other, the enigmatic data string can consist of binary numbers that cause a display of strange characters that are difficult for humans to key into a keypad, i.e. non-alpha-numerics. The string of strange characters may be copied and pasted by the user of the neighbor phone from one connection to the other.
14. If the neighbor phone is a new phone, it's restricting function is designed to allow automatic passing of SMS messages described above, even though user display functions for SMS messaging are restricted due to motion.
15. At this point, the new phone 1 unrestricts itself and sends to the network the phone number (network identifier) of the neighbor phone 2 and the network compares usage patterns of the new phone and the neighbor phone using the method described in Appendix B. If the phones are determined to be typically used by a single person, the network sends a command back to the new phone 1 to restrict and not accept again that neighbor phone 2 for unrestricting for D2 days. A preferred number for D2 is 4 days.

Here is a particular implementation of the above described method:

New Phone:
1. When speed exceeds about 15 mph, SMS ringing and message displays are prevented. The display looks different to show the restriction: a new background color (red) or a large new symbol or the word "Restricted" appears on the display. Display returns to normal about 2 minutes after speed drops below threshold.
2. User presses an "unrestrict" button or tries to read or compose a SMS. Phone detects nearby Bluetooth devices and display lists the "old" phone. User instructs to connect. If connection is accepted, phone sends new phone's number and a pseudo-random ("enigmatic") numeric string.

Old Phone:
3. Bluetooth connection request is received. Program causes the phone to accept the request (perhaps with user input) and uses the data from the Bluetooth connection to automatically send an SMS message to the new phone, including the enigmatic data string. Program can be set to require user acceptance of the Bluetooth connection every time or the first time.

New Phone:
4. Receives SMS message (and suppresses the ring and display of the SMS message). Unrestricts to show normal display and allow normal use.
5. Every 2-4 minutes, new phone checks for Bluetooth connection. If it has failed, the connection is reestablished. If it cannot be reestablished and the phone is still moving, the phone is again restricted and returned to step 1.

Old Phone:
6. Reestablish connection on request (without requiring user input if easy to do).

CLAIMS DETERMINE SCOPE OF INVENTIONS

The scope of inventions taught in this document is not to be limited by the description above. The scope is as broad as the following claims.

The invention claimed is:

1. A motor vehicle having a camera assembly aimed at a driver's seat with an authentication chip, comprising:
   a. a motor vehicle having a driver's seat;
   b. mounted inside the vehicle in front of the driver's seat and aimed at the driver's seat, a camera;
   c. coupled to the camera, an image processor circuit;
   d. coupled to the image processor circuit, a radio communications circuit coupled to an antenna which radio communications circuit and antenna allow bi-directional radio communications to and from another radio device; and
   e. coupled to the radio communications circuit, a crypto-authentication chip which authenticates the image processor circuit to another device via the radio communications circuit.

2. The motor vehicle of claim 1 further comprising:
   f. coupled to the radio communications circuit, a global position determining circuit that determines speed of movement and a circuit that determines data sent from the radio communications circuit and adjusts such data based on the speed of movement.

3. The motor vehicle of claim 1 wherein the camera includes an ability to capture an image in infra-red spectra.

4. The motor vehicle of claim 1 wherein the authenticating circuit is a crypto-authenticating circuit that receives as input from a remote device via the radio communications circuit a first data string and, in response, outputs a second data string via the radio communications circuit, which second data string cannot be determined by computation from knowing the first data string without having a key.

5. A camera assembly mountable in a motor vehicle and, when so mounted, aimable at a driver's seat, comprising:
   a. a camera;
   b. coupled to the camera, an image processor circuit;
   c. coupled to the image processor circuit, a radio communications circuit coupled to an antenna which radio communications circuit and antenna allow bi-directional radio communications to and from another radio device; and
   d. coupled to the radio communications circuit, a crypto-authentication chip which authenticates the image processor circuit to another device via the radio communications circuit.

6. The camera assembly of claim 5 further comprising:
   f. coupled to the radio communications circuit, a global position determining circuit that determines speed of movement and a circuit that determines data sent from the radio communications circuit and adjusts such data based on the speed of movement.

7. The camera assembly of claim 5 wherein the camera includes an ability to capture an image in infra-red spectra.

8. The camera assembly of claim 5 wherein the authenticating circuit is a crypto-authenticating circuit that receives as input from a remote device via the radio communications circuit a first data string and, in response, outputs a second data string via the radio communications circuit, which second data string cannot be determined by computation from knowing the first data string without having a key.

9. The camera assembly of claim 5 wherein the camera assembly gets power from the vehicle.

10. The camera assembly of claim 5 wherein the camera assembly gets power from a battery.

11. The camera assembly of claim 10 wherein the battery gets power from a solar cell.

* * * * *